(12) United States Patent
Andresen et al.

(10) Patent No.: US 6,518,207 B1
(45) Date of Patent: Feb. 11, 2003

(54) AGRICULTURAL BELTING

(75) Inventors: Frederic Pember Andresen, Dublin, OH (US); Jenny Zhaoxia Yu, Dublin, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/743,733

(22) PCT Filed: Jul. 21, 1998

(86) PCT No.: PCT/US98/14663

§ 371 (c)(1),
(2), (4) Date: Jan. 15, 2001

(87) PCT Pub. No.: WO00/05158

PCT Pub. Date: Feb. 3, 2000

(51) Int. Cl.$^7$ ................................................. B32B 5/26
(52) U.S. Cl. ........................ 442/208; 442/209; 442/218; 442/250
(58) Field of Search ................................ 442/250, 208, 442/209, 218

(56) References Cited

U.S. PATENT DOCUMENTS 4,518,647 A  5/1985  Morrison .................... 428/250
5,244,717 A  * 9/1993  Cloer

FOREIGN PATENT DOCUMENTS

| DE | 2519448 | 8/1976 | |
| EP | 0489694 | 6/1992 | ........... B65G/15/34 |
| FR | 2135276 | 12/1972 | ........... B65G/15/00 |

* cited by examiner

Primary Examiner—Elizabeth M. Cole
(74) Attorney, Agent, or Firm—Nancy T. Krawczyk

(57) ABSTRACT

An improved agricultural belting (1) formed of multiple fabric by layers (2, 3 or 4), interposing rubber layers (5, 6) and rubber cover layers (7, 8). The fabric plies are a woven of warp yarns (10) extending in the longitudinal direction of the belt (1) and fill yarns (11) extending in the transverse direction of the belt (1). To optimize the transverse stiffness of the belting and other properties of the belt, any of the fabric plies (2, 3, or 4) are formed with selective replacement of the multifilament fill yarns (11) with monofilament cords (13). The fabric ply (2, 3, or 4) formed with monofilament cords (13) has at most fifty percent monofilament fill cords (13).

10 Claims, 1 Drawing Sheet

AGRICULTURAL BELTING

This application is a 371 of PCT/US98/14663 filed Jul. 21, 1998.

FIELD OF THE INVENTION

The disclosed invention is directed toward bale forming belts on round hay balers. More specifically, the invention is a bale forming belt with an improved transverse stiffness and excellent fastener retention.

BACKGROUND OF THE INVENTION

This invention addresses the need to make the bale forming belts on round hay balers stiffer in the transverse direction. The increase in transverse stiffness counteracts the tendency of the belts to roll over on itself causing damage to the belt and shortening the service life of the belt. Also transversely stiff belts maintain their position on the machine when slack, i.e. very low tension, conditions occur during baler operations. Increased transverse stiffness has long been recognized as a desirable feature in belts used on round hay balers. Manufacturers of these balers have historically advised belt producers of their desire for improved transverse stiffness to enhance the operation of round balers.

Increased transverse stiffness must be achieved without a loss of fastener retention. The belts must have excellent fastener holding properties, both as measured by static pull tests and by dynamic tests. The fastened ends of the belt represent the critical point for maintaining service life of the belt.

The increased transverse stiffness ideally should also be achieved in combination with optimized longitudinal flexibility. The hay baling belts should have sufficient flexibility to enable the belts to run around the relatively small pulleys of the hay baling machines.

The most effective method of increasing transverse stiffness is to use extruded monofilament cords of polyester, nylon, glass, or other material in the outside plies of these multiply belts. The monofilament cords are oriented in the transverse direction.

Current technology, as seen in U.S. Pat. No. 4,518,647, uses outside plies that contain 100% monofilament fill cords. While this approach achieves dramatic transverse stiffness in the belt, there are shortcomings in the physical properties and cost of the belt.

Monofilament cords have lower tensile strength than comparable sized twisted multifilament cords. While a belt with 100% monofilament fill cords has dramatically high transverse stiffness, the tensile strength of the belt is reduced. In addition, due to the extremely smooth outer surface of the monofilament, the cord has a limited adhesive dip pick up.

The disclosed belt construction has optimized properties of transverse stiffness and tensile strength. The fastener holding capabilities, as well as other physical properties, are maintained at a desired level. The inventive construction also keeps the cost increase, due to the use of monofilament cords, proportionate to the benefit gained in increased transverse stiffness, producing a more cost efficient product.

SUMMARY OF THE INVENTION

In accordance with the present invention, a belting material is disclosed which has optimized transverse stiffness and improved fastener holding capabilities.

In accordance with the disclosed invention, a multi-ply belting material is disclosed wherein at least one woven ply has at most a fifty percent fill rate in the weft, or fill, direction of monofilament cords.

In a further aspect of the disclosed invention, the belting material is disclosed with a minimum of five percent monofilament cords in the fill direction of the woven belting ply material.

In another aspect of the disclosed invention, the belting material is disclosed wherein at least one woven ply has between five to fifty percent extruded monofilament cords in the fill direction.

In accordance with another embodiment of the present invention, a three ply belting material is disclosed wherein the outermost woven plies have, in the fill direction, at most fifty percent monofilament cords.

In accordance with another aspect of the present invention, belting material is disclosed which has optimized transverse stiffness, improved fastener holding capabilities, and improved longitudinal flexibility.

In accordance with another embodiment of the present invention, a two-ply belting is disclosed wherein both woven plies have at most, in the fill direction, fifty percent monofilament cords.

In accordance with a further aspect of the invention, the two ply belting has a monofilament fill frequency of fifty to five percent.

DEFINITIONS

"Fabric" denotes a network of essentially unidirectionally extending cord/yarns, which may be twisted, and which may in turn be composed of a pluabty of a multiplicity of filaments (which may also be twisted). The fabric is woven and flexible.

"Fill" refers to the cord/yarn woven at right angles to the warp cord/yarn or warp direction of the fabric.

"Warp" refers to a network of essentially unidirectionally extending cords/yarns, which extend in the longitudinal direction of the belt.

"Weft" (filling) refers to the cord/yarn placed at right angles to the warp cord/yarns.

"Yarn": a generic term for a continuous strand of textile fibers or filaments. Yarn occurs in the following forms:
1) a number of fibers twisted together;
2) a number of filaments laid together without twist;
3) a number of filaments laid together with a degree of twist;
4) a single filament with or without twist (monofilament).

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
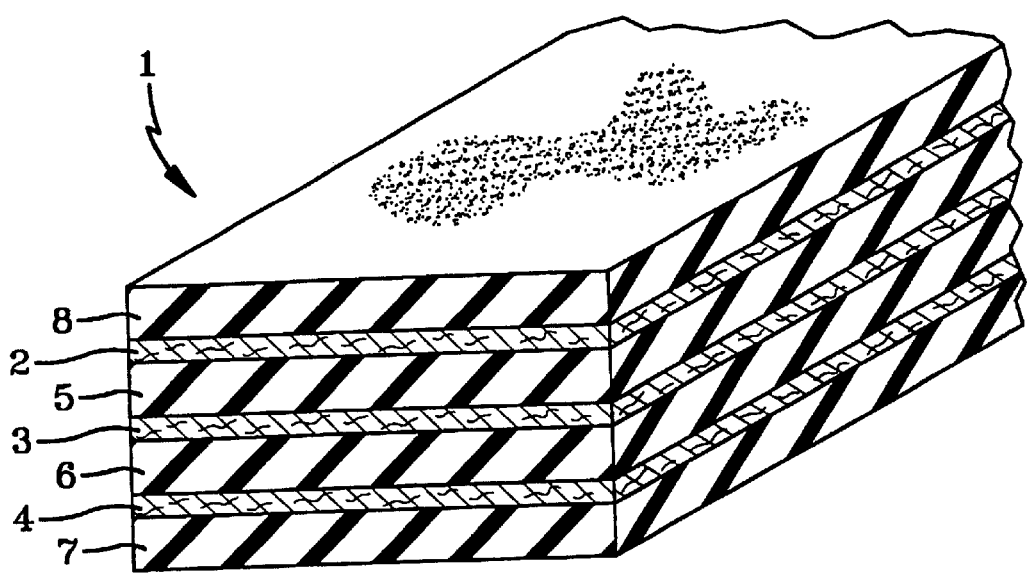
FIG. 1 is a cut section of the inventive three ply belting.

FIG. 1 illustrates a three ply belting 1 within the scope of the present invention. The belting has a first outer fabric ply 2, a second outer fabric ply 3, and an inner fabric ply 4. The is inner fabric ply 4 is substantially centered in the belting 1. The fabric ply 4 is a woven synthetic fabric. The selected materials are those conventionally used in belting, such as polyester, nylon, and glass. The material is selected such that the center fabric ply has a modulus and flex fatigue life less than the modulus and flex fatigue life of the outer fabric plies. Interposed between the fabric plies are rubber skim layers 5, 6. Outward of each outer fabric ply is an additional rubber cover layer 7, 8. The length of the belting extends in the longitudinal direction of the belt, while the width of the belting extends in the transverse direction.

Figure 2:
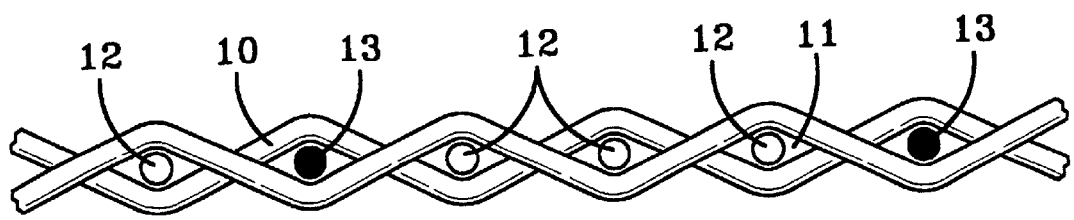
FIG. 2 is a cross-sectional view of the outer fabric plies.

The outer plies 2,3 are made of a woven fabric. The fabric is illustrated in FIG. 2. Longitudinally extending warp yarns 10 are interwoven with transverse fill yarns 11. The fill yarns 11 are a predetermined combination of multi-filament cords 12 and monofilament cords 13. Illustrated is a monofilament cord fill frequency of one cord at every fourth fill location, yielding a woven fabric with a twenty-five percent fill rate of the monofilament cords. The frequency of the monofilament cords is varied to achieve a measured amount of transverse stiffness increase without adversely affecting the physical properties of the belt.

The fill frequency of the monofilament cord is within the range of fifty percent to five percent of the fill yarns. The minimum fill ratio of the monofilament cord is limited by the desired transverse stiffness. The maximum fill ratio of the monofilament cord is limited by maintaining a desired rubber adhesion characteristic and tensile strength of the fabric. When the monofilament cords are evenly spaced in the fill direction of the fabric, the monofilament cords are located every other to every twelfth fill location.

The monofilament fill locations may also be a repeating series of adjacent monofilament with a repeating series of multifilament fill cords. For example, two adjacent monofilaments cords are next to three adjacent multifilament cords wherein for each length of belting fabric, the total fill frequency of the monofilament cords is not more than fifty percent.

Due to the selective placement of the monofilament cord in the fabric ply 2, the belting retains the needed fastener retention properties. The monofilament fill frequency is varied to achieve a measured amount of transverse stiffness increase without adversely affecting the physical properties of the current belt design. To achieve a desired physical effect, the fill frequency in the plies may even differ.

The monofilament cord may be formed from extruded monofilament cords of polyester, nylon, or glass. The diameter of the monofilament cord is selected to approximate the diameter of the multifilament yarn in order to produce an even fabric. By way of a non-limiting example, when using multifilament yarns of 1260 den/3, the monofilament cord ideally has a diameter of 0.5 mm. Other monofilament diameters such as 0.9 mm and 0.7 mm may also be employed.

The multifilament yarns in the fill direction are polyester, nylon, or glass yarns. The yarns in the warp direction of the fabric are conventional belting materials such as polyester, nylon, or glass.

After the fabric ply is formed with the desired combination of multifilament and monofilament cords, the fabric is treated for improved rubber adhesion in accordance with conventional techniques, such as RFL dipping.

The present invention is also applicable for two ply belting. One embodiment of a two ply belt in accordance with the present invention provides for both plies to be of the disclosed inventive fabric. An alternative embodiment of the two ply belting incorporates only one ply of the monofilament reinforced fabric. The fabric plies, whether of the inventive fabric or conventional woven fabric of lower modulus, are each provided with a skim layer 5 or 6 positioned between the fabric plies upon final assembly.

Outward of each fabric ply is a rubber cover layer 7, 8. If the belting is formed of a combination of conventional woven fabric and the inventive fabric, the skim gauge on the conventional ply may be reduced to accommodate a required total thickness of the belt.

Comparison testing of a 2 ply belt made in accordance with the disclosed invention, a conventional 3-ply belt, and a conventional 2 ply belt was done, and the results thereof are set forth in Table 1.

TABLE 1

|  | 3 ply | 2 ply | 2 ply |
|---|---|---|---|
| Belt Design: | | | |
| Outer Plies - warp | 100% polyester | 100% nylon | 100% nylon |
| Outer Plies - fill | 100% monofil. | 100% nylon | 75% nylon 25% monofil. |
| Center Ply - warp | 100% polyester | — | — |
| Center Ply - fill | 100% polyester | — | — |
| Belt Physical Properties | | | |
| Ply Adhesion, lb. | 45 | 76 | 77 |
| Breaking Strength, PIW | 2,467 | 3,447 | 3,762 |
| Elongation at 220 PIW | 1.57% | 3.51% | 3.37% |
| Elongation at 300 PIW | 2.25% | 4.67% | 5.09% |
| Transverse Tear, lb. | 233 | 516 | 536 |
| Longitudinal Tear, lb. | 190 | 501 | 445 |
| Rip, lb. | 483 | 1,222 | 982 |
| uz,1/9 Fastener Holding: | | | |
| Clipper 4½ HT rectangular & PIW* | 665 | 780 | 776 |
| Clipper - Mato U35, PIW | 1,922 | 2201 | 2,265 |
| Dynamic Testing: | | | |
| Permanent Elongation | .49% | 2.61% | 3.28% |
| Dynamic Modulus | 6,746 | 6,745 | 5,839 |
| Belt Stiffness:** | | | |
| Longitudinal, lb. | 2.19 | .67 | 1.12 |
| Transverse, lb. | 5.61 | 2.38 | 3.66 |

*fasteners straight out; belt does not fail
**determined by a 3 point deflection test, lbs required for 1.5 inches deflection Ply Adhesion. The 77 lbs. of ply adhesion for the inventive belt versus the 45 lbs. for the conventional 3 ply belt translates into longer service life for the disclosed belt and counteracts ply separation along the belt edges. Substantially equivalent adhesion values for the inventive 2 ply belt and the conventional 2 ply demonstrates that with the inventive belt, no ply adhesion properties are lost by the inclusion of the smaller percentage of monofilament cords.

Breaking Strength. Greater breaking strength is preferred for hay baling belts. Higher breaking strengths aid in resisting damage from any abusive service conditions. The breaking strength for the inventive belt is greater than for the conventional 2 or 3 ply belts.

Transverse Tear. When belts "break" or come apart during service, the usual mode of failure is transverse tear. The exemplary inventive use of nylon yarns in the warp direction and the combination of nylon yarns and monofilament cords result in transverse tear resistance more than double that for the conventional belting.

Longitudinal Tear and Rip. These two tests measure the ability of the belt to withstand forces that rupture the belt and propagate the break longitudinally along the belt length.

Such tears are primarily caused by rocks, sticks, and other such items being picked up and puncturing the belt during baler operations. The inventive belt has values more than twice that of the conventional 3-ply belt.

Fastener Holding. The disclosed belt exhibits higher pull-out values than the conventional 3-ply belt, and values comparable to a conventional 2-ply belt.

Longitudinal Stiffness. The inventive belt has longitudinal stiffness half that of the conventional 3-ply belt. This longitudinal flexibility, i.e. lower longitudinal stiffness, is an important characteristic that has been identified as essential for belt movement around the relatively small pulleys of the haybaling machines.

Transverse Stiffness. The inventive belt has a transverse stiffness 54% greater than the conventional 2-ply belt. While the inventive belt has a transverse stiffness less than that of the 3-ply belt, the greater tear properties compensate for the stiffness.

The disclosed inventive belting achieves the objective of increasing transverse properties while maintaining other necessary physical properties for good belt performance.

What is claimed is:

1. An improved multiple ply belting (1) comprising at least two fabric plies (2, 3, or 4) having fill cords (11) extending in the transverse direction of the belt, a rubber layer (5, or 6) disposed between the fabric plies (2, 3, or 4), and outer coating rubber layers (7, 8), the belting (1) being characterized by:
    at least one of the fabric plies (2, 3, or 4) having monofilament cords (13) in an amount of 5% to 50% of the fill cords (11).

2. An improved belting (1) as set forth in claim 1 wherein the at least one fabric ply (2, 3, or 4) has a monofilament cord fill frequency in the range of one cord (13) every other fill location (11) to one cord (13) every twelfth fill location (11).

3. An improved belting (1) as set forth in claim 1 wherein the at least one fabric ply (2, 3, or 4) has a monofilament cord fill frequency of one cord (13) every other fill location (11).

4. An improved belting (1) as set forth in claim 1 wherein the belt (1) is comprised of two plies of the fabric (2, 3, or 4) having monofilament cords (13) in an amount not more than 50% of the fill cords (11).

5. An improved belting (1) as set forth in claim 4 wherein the two fabric plies (2, 3, or 4) each have a monofilament cord fill frequency in the range of one cord (13) every other fill location (11) to one cord (13) every twelfth fill location (11).

6. An improved belting (1) as set forth in claim 5 wherein the two fabric plies (2, 3, or 4) have differing fill frequency of the monofilament cords (13) in the first and second fabric plies (2, 3, or 4).

7. An improved multiple ply belting (1), comprising a center fabric ply (4), a first (2) and second (3) fabric plies disposed on opposite sides of the center fabric ply (4), the first (2) and second (3) fabric plies having fill cords (11) extending in the transverse direction of the belting (1), and a plurality of rubber layers (5, 6, 7, and 8) disposed on opposite sides of the first and second fabric plies, the belting (1) being characterized by:
    the first (2) and second (3) fabric plies having monofilament fill cords (13) in an amount 5% to 50% of the fill cords (11).

8. An improved belting (1) as set forth in claim 7 wherein the first (2) and second (3) fabric plies have a monofilament cord fill frequency in the range of one cord (13) every other fill location (11) to one cord (13) every twelfth fill location (11).

9. An improved belting (1) as set forth in claim 7 wherein the first (2) and second (3) fabric plies have a monofilament cord fill frequency of one cord (13) every other fill location (11).

10. An improved belting (1) as set forth in claim 7 wherein the first (2) and second (3) fabric plies have differing fill frequency of the monofilament cords (13).

* * * * *